UNITED STATES PATENT OFFICE.

JAMES B. GARNER AND HOWARD D. CLAYTON, OF PITTSBURGH, PENNSYLVANIA, ASSIGNORS TO METALS RESEARCH COMPANY, OF NEW YORK, N. Y., A CORPORATION OF MAINE.

UTILIZATION OF SULFUR DIOXID.

1,173,566.     Specification of Letters Patent.     Patented Feb. 29, 1916.

No Drawing.     Application filed March 4, 1915. Serial No. 12,134.

*To all whom it may concern:*

Be it known that we, JAMES B. GARNER and HOWARD D. CLAYTON, both citizens of the United States, residing, respectively, at Pittsburgh, Allegheny county, State of Pennsylvania, have invented certain new and useful Improvements in the Utilization of Sulfur Dioxid; and we do hereby declare the following to be a full, clear, and exact description of the invention, such as will enable others skilled in the art to which it appertains to make and use the same.

The present invention relates to the utilization of sulfur dioxid and is based upon the discovery that when a mixture containing sulfur dioxid and gaseous fuel or fuels is permitted to react, under a suitable temperature, in the presence of a catalyzer such as wood-charcoal, elemental sulfur and other products will result, depending upon the composition of the gaseous fuels and the proportions in which they are present in the mixture. Where sulfur alone is to be produced, the gaseous fuels employed in admixture with the sulfur dioxid may be producer gas or natural gas. Where either sulfur or hydrogen sulfid are to be produced, the gaseous fuels employed may be coal gas, water gas, or hydrogen, which gases, if used in excess of the quantities required for the complete conversion of carbon monoxid into carbon dioxid, react to that extent with the sulfur to form hydrogen sulfid, as will hereinafter more fully appear.

The nature and scope of the invention will be made apparent from the following typical instances which are given as illustrating the preferred practice of the invention:

(1) One volume of sulfur dioxid and two volumes of water-gas are led into a reaction chamber more or less completely filled with wood charcoal, the constituent gases being either dry, or containing more or less moisture. The reaction chamber containing the wood charcoal and into which the mixture of sulfur dioxid and water-gas is led is heated to a minimum temperature of about 525° C. The mixture reacts quantitatively and smoothly to produce sulfur, water, and carbon dioxid. The reaction may be expressed as follows:

These products pass from the reaction chamber and the sulfur and the water are collected in suitable condensers while the carbon dioxid escapes into the air.

If it is desired to produce hydrogen sulfid an excess of water-gas may be used whereby the following reaction may be realized in the cooler portion of the chamber:

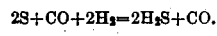

(2) One volume of sulfur dioxid and two volumes of hydrogen are led into a reaction chamber more or less completely filled with wood charcoal. The mixture of gases may be either dry or may contain more or less moisture. The chamber containing the wood charcoal and into which the mixture of one volume of sulfur dioxid and two volumes of hydrogen is led is heated to a minimum temperature of about 500° C. The reaction may be expressed as follows:

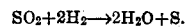

The products of the reaction pass from the chamber and are collected in suitable condensers.

If it is desired to produce hydrogen sulfid an excess of hydrogen may be used, whereby the following reaction may be realized in the cooler parts of the chamber:

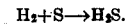

(3) Twelve volumes of sulfur dioxid and ten volumes of coal gas are led into a chamber more or less completely filled with wood charcoal. The mixture of gases may be either dry or may contain more or less moisture. The reaction chamber is heated to a minimum temperature of about 500° C. The mixture reacts quantitatively and smoothly to produce sulfur, carbon dioxid and water. The reaction may be expressed as follows:

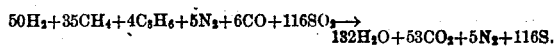

The products of the reaction issue from the reaction chamber and the sulfur and water are collected in suitable condensers, the carbon dioxid being permitted to escape into the air or it may be recovered by any suitable means.

If it is desired to produce hydrogen sulfid, an excess of coal gas may be used whereby the following reaction may be realized in the cooler parts of the chamber:

$$H_2 + S \rightarrow H_2S.$$

(4) Approximately eleven volumes of sulfur dioxid and five volumes of natural gas are led into a chamber more or less completely filled with wood charcoal. The main constituents of natural gas are methane, ethane, nitrogen and carbon dioxid, and the mixture may be either dry or may contain more or less moisture. The chamber containing the wood charcoal and into which the mixture of approximately eleven volumes of sulfur dioxid and five volumes of natural gas is led is heated to a maximum temperature of about 600° C. The mixture reacts quantitatively and smoothly to produce sulfur, carbon dioxid and water. The reaction may be expressed as follows:

$$41CH_4 + 8C_2H_6 + .75N_2 + .25CO_2 + 110SO_2 \rightarrow 57.25CO_2 + .75N_2 + 106H_2O + 110S$$

The products of the reaction issue from the chamber and the sulfur and water are collected in suitable condensers while the carbon dioxid is permitted to escape into the air or it may be recovered by any suitable means.

(5) Approximately seven volumes of sulfur dioxid and forty volumes of producer gas are led into a chamber more or less completely filled with wood charcoal. The producer gas consists mainly of carbon monoxid, nitrogen, hydrogen and carbon dioxid, and the mixture of the gases is either dry or contains more or less moisture. The reaction chamber containing the wood charcoal and into which the mixture of about seven volumes of sulfur dioxid and forty volumes of producer gas is led is heated to a minimum temperature of about 500° C. The mixture reacts quantitatively and smoothly to produce sulfur, carbon dioxid and water. The reaction may be expressed as follows:

$$260N_2 + 6H_2 + 132CO + 2CO_2 + 69SO_2 \rightarrow 260N_2 + 6H_2O + 134CO_2 + 69S.$$

The products of the reaction issue from the chamber and the water and sulfur are collected in suitable condensers while the carbon dioxid and nitrogen escape into the air or are recovered by suitable means.

It will be noted that in every case by varying the composition of the gaseous mixtures, as indicated by the foregoing equations, any relative quantity of sulfur or hydrogen sulfid may be produced at will and that the reactions take place smoothly and quantitatively, the carbon serving as a catalyzer. It is also obvious that by an appropriate mixture of any of these gaseous materials hydrogen sulfid, or sulfur, as desired, will result. Furthermore, as the temperatures at which these reactions proceed smoothly is within a range of from 500–600° C., it is obvious that somewhat higher temperatures will in each instance, give the same reactions, for while the hydrogen sulfid first formed might be to a certain extent decomposed in the reaction zone, (it decomposes at about 400° C.) it will be re-formed by the union of hydrogen with sulfur in the cooler parts of the chamber. It may be said, however, that if the catalyzer, carbon, is to be used over and over again, the temperatures should not greatly exceed those specified, for the reason that at higher temperatures carbon itself reacts with sulfur dioxid to give carbon dioxid and sulfur, and would therefore be used up. In the preferred practice of the invention, it is not intended that there should be any consumption of the carbon, the wood charcoal not being altered during the reaction, its function being that of an absorbent for the gases and a catalyzer for the first reaction, which is made to take place more smoothly and regularly than without charcoal.

What we claim is:

1. The method of utilizing sulfur dioxid, which comprises subjecting it to reaction with gaseous fuel containing carbon monoxid and hydrogen in the presence of wood charcoal at a temperature below that at which the charcoal would be consumed in the gaseous mixture; substantially as described.

2. The method of utilizing sulfur dioxid, which comprises subjecting it to reaction with gaseous fuel capable of reducing sulful dioxid in the presence of wood charcoal at a temperature of about 500 to 600° C.; substantially as described.

3. The method of utilizing sulfur dioxid, which comprises subjecting it to reaction with gaseous fuel containing hydrogen in the presence of wood charcoal at a temperature below that at which the charcoal would be consumed in the gaseous mixture, the gaseous fuel being employed in excess of that necessary for converting the sulfur dioxid into sulfur, whereby the hydrogen of the excess will react with the sulfur produced to form hydrogen sulfid; substantially as described.

4. The method of utilizing sulfur dioxid, which comprises subjecting it to reaction with gaseous fuel in the presence of wood charcoal at a temperature below that at which the charcoal would be consumed in the gaseous mixture, the gaseous fuel being employed in excess of that necessary for converting the carbon monoxid into carbon dioxid whereby the hydrogen of the excess will react with the sulfur produced to form hydrogen sulfid; substantially as described.

In testimony whereof we affix our signatures, in presence of two witnesses.

JAMES B. GARNER.
HOWARD D. CLAYTON.

Witnesses:
W. J. MOORE,
M. R. HAINER.